US010095606B2

(12) United States Patent
Tsirkin

(10) Patent No.: US 10,095,606 B2
(45) Date of Patent: Oct. 9, 2018

(54) GUEST-INDEPENDENT TESTING OF GUEST FIRMWARE IN VIRTUALIZED SYSTEMS

(71) Applicant: Red Hat Israel, Ltd., Raanana (IL)

(72) Inventor: Michael Tsirkin, Yokeneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 131 days.

(21) Appl. No.: 14/310,783

(22) Filed: Jun. 20, 2014

(65) Prior Publication Data

US 2015/0370692 A1    Dec. 24, 2015

(51) Int. Cl.
G06F 11/36    (2006.01)

(52) U.S. Cl.
CPC ................ *G06F 11/3672* (2013.01)

(58) Field of Classification Search
CPC ............ G06F 9/45558; G06F 9/45533; G06F 2009/45583; G06F 2009/45587
See application file for complete search history.

(56) References Cited

U.S. PATENT DOCUMENTS

| 7,127,579 | B2 | 10/2006 | Zimmer et al. | |
|---|---|---|---|---|
| 7,827,371 | B2 | 11/2010 | Yao et al. | |
| 8,185,766 | B2 | 5/2012 | Barde | |
| 8,321,931 | B2 | 11/2012 | Zimmer et al. | |
| 8,607,032 | B2 | 12/2013 | Heller | |
| 2006/0036889 | A1* | 2/2006 | Arai | G06F 11/203 714/1 |
| 2009/0113422 | A1* | 4/2009 | Kani | G06F 9/5077 718/1 |
| 2010/0218183 | A1* | 8/2010 | Wang | G06F 1/3228 718/1 |
| 2013/0151831 | A1 | 6/2013 | Bealkowski et al. | |
| 2013/0159649 | A1* | 6/2013 | Sherwood | H04L 67/1095 711/162 |
| 2013/0347131 | A1 | 12/2013 | Mooring et al. | |
| 2014/0298340 | A1* | 10/2014 | Imaizumi | G06F 12/0284 718/1 |
| 2014/0331222 | A1* | 11/2014 | Zheng | G06F 9/45558 718/1 |

OTHER PUBLICATIONS

Koerner, S. et al., Firmware Verification and Simulation in IBM zEnterprise 196 (Abstract), IBM Journal of Research and Development (vol. 56, Issue 1.2), Jan.-Feb. 2012, http://ieeexplore.ieee.org/xpl/login.jsp?tp=&arnumber=6139292&url=http%3A%2F%2Fieeexplore.ieee.org%2Fxpls%2Fabs_all.jsp%3Farnumber%3D6139292, retrieved May 29, 2014, 1 page.
Tsirkin, M.S., [Qemu-devel] [PATCH RFC 00/13] qemu: generate acpi tables for the guest, May 13, 2013, http://lists.gnu.org/archive/html/qemu-devel/2013-05/msg01714.html, retrieved May 29, 2014, 4 pages.
Cheng, Y. et al., Guardian: Hypervisor as Security Foothold for Personal Computers, 2013, Singapore University, http://link.library.smu.edu.sg/cgi/viewcontent.cgi?article=2969&content=sis_research, 19 pages.

* cited by examiner

*Primary Examiner* — Jigar Patel
(74) *Attorney, Agent, or Firm* — Womble Bond Dickinson (US) LLP

(57) ABSTRACT

A system and methods are disclosed for testing guest firmware in virtualized computer systems. In accordance with one embodiment, a hypervisor executed by a processing device infers that firmware has created a system table in a portion of memory of a virtual machine. In response to the inferring, the hypervisor locates the system table and executes one or more commands to test the system table.

20 Claims, 5 Drawing Sheets

GUEST-INDEPENDENT TESTING OF GUEST FIRMWARE IN VIRTUALIZED SYSTEMS

TECHNICAL FIELD

This disclosure relates to computer systems, and more particularly, to virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, typically in a one-to-one fashion, to a device of the host machine (e.g., a network interface device, a CD-ROM drive, etc.). The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and methods for testing of guest firmware in virtualized computer systems. In accordance with one embodiment, a hypervisor executed by a processing device infers that firmware has created a system table (e.g., an Advanced Configuration and Power Interface [ACPI] table, a System Management Basic Input/Output System [SMBIOS] table, etc.) in a portion of memory of a virtual machine. In response to the inferring, the hypervisor locates the system table and executes one or more commands to test the system table. In one example, the one or more commands comprises computing a checksum of the system table and comparing the computed checksum to an expected value.

In one embodiment, the hypervisor infers that guest firmware has created the system table when the hypervisor has detected that the virtual machine associated with the guest firmware has begun executing guest code. In one such example, the hypervisor provides to the virtual machine guest code comprising code that halts a virtual processor, and the hypervisor then confirms that a virtual processor of the virtual machine has halted. In another such example, the hypervisor provides to the virtual machine guest code comprising code that writes a datum known to the hypervisor to a memory address known by the hypervisor, and the hypervisor then confirms that the memory address contains the datum. In one implementation, the guest code may be stored in a boot sector of a virtual disk of the virtual machine.

In some embodiments, after the hypervisor has located the system table, the hypervisor provides the system table to a testing application that performs additional testing of the system table. In some other embodiments, the hypervisor itself executes the command(s) to test the system table. In one such example, the hypervisor receives from the testing application a memory access command that accesses the portion of memory of the virtual machine, and then uses the memory access command as one of the command(s) to test the system table.

Embodiments of the present disclosure thus enable guest firmware to be tested without any active participation by the guest. In contrast, in the prior art system tables associated with guest firmware are typically tested by first booting a guest operating system (OS), submitting a request to the guest OS for the system tables, receiving the system tables from the guest OS, and then testing the system tables. In addition to requiring booting of an entire guest OS, which can consume copious amounts of time and memory, this procedure also relies on an operational means of communication with the guest, and this means of communication may require significant effort and resources to establish and maintain and is inherently susceptible to failures. Embodiments of the present disclosure, in contrast, do not suffer from these drawbacks and are therefore more efficient and robust.

Figure 1:
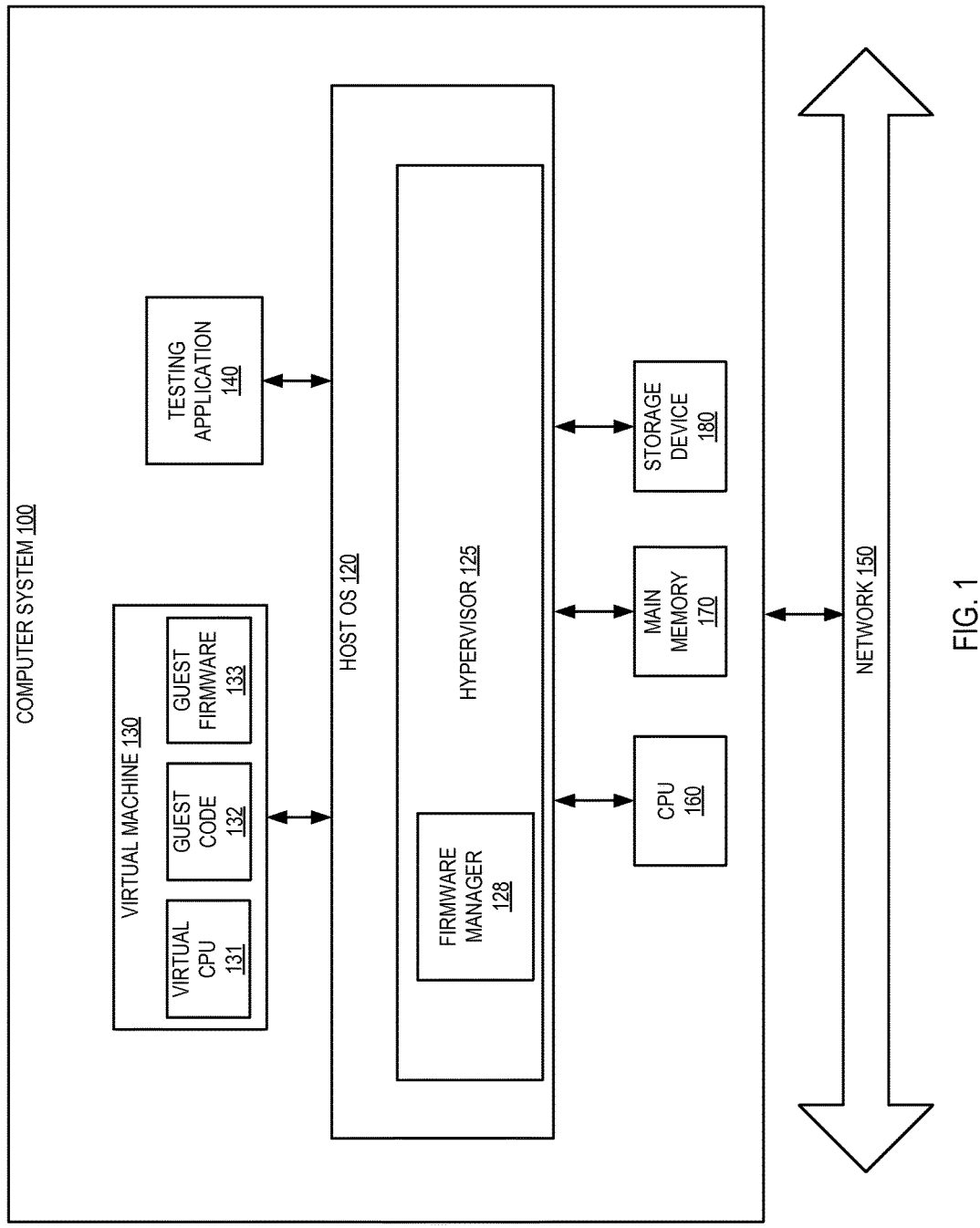
FIG. 1 depicts an illustrative computer system architecture, in accordance with an embodiment of the present disclosure.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises central processing unit (CPU) 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 runs a host operating system (OS) 120 that manages the hardware resources of the computer system and that provides functions such as interprocess communication, scheduling, virtual memory management, and so forth. As shown in FIG. 1, computer system 100 also comprises a testing application 140 for testing system tables (e.g., ACPI tables, SMBIOS tables, etc.). In some examples, host operating system 120 also comprises a hypervisor 125, which provides a virtual operating platform for virtual machine 130 and that manages its execution.

Virtual machine 130 is a software implementation of a machine that executes programs as though it were an actual physical machine. As shown in FIG. 1, virtual machine 130 comprises a virtual processor 131, which is software emulating a physical processor, guest code 132, and guest firmware 133. In one example, hypervisor 125 maps virtual processor 131 to CPU 160 in a transparent fashion, so that guest code 132 interacts with virtual processor 131 as though it were an actual physical processor. It should be noted that although, for simplicity, a single virtual machine is depicted in FIG. 1, in some other embodiments computer system 100 may host a plurality of virtual machines. Similarly, although a single virtual processor 131 is depicted in FIG. 1, in some other embodiments virtual machine 130 may comprise a plurality of virtual processors.

Figure 2:
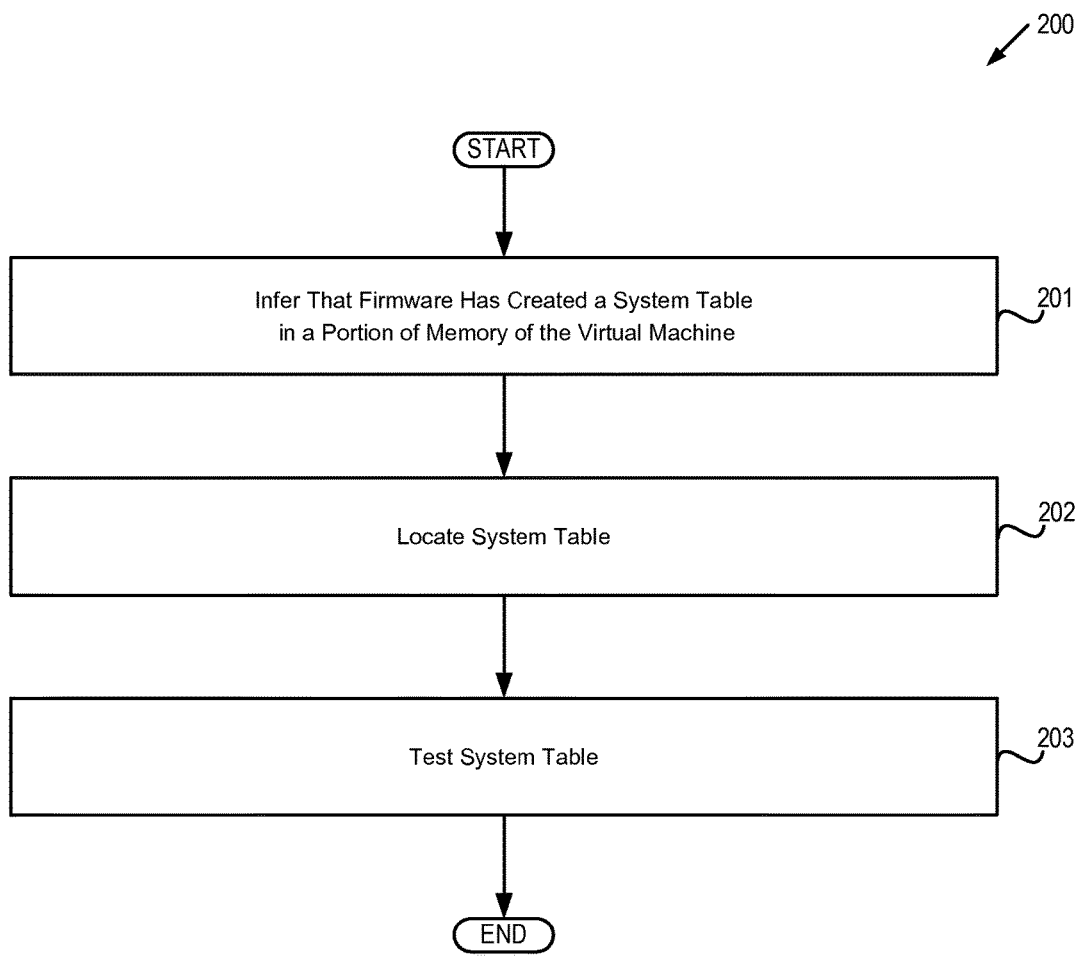
FIG. 2 depicts a flow diagram of one embodiment of a method for testing a system table associated with guest firmware of a virtual machine.
Figure 3:
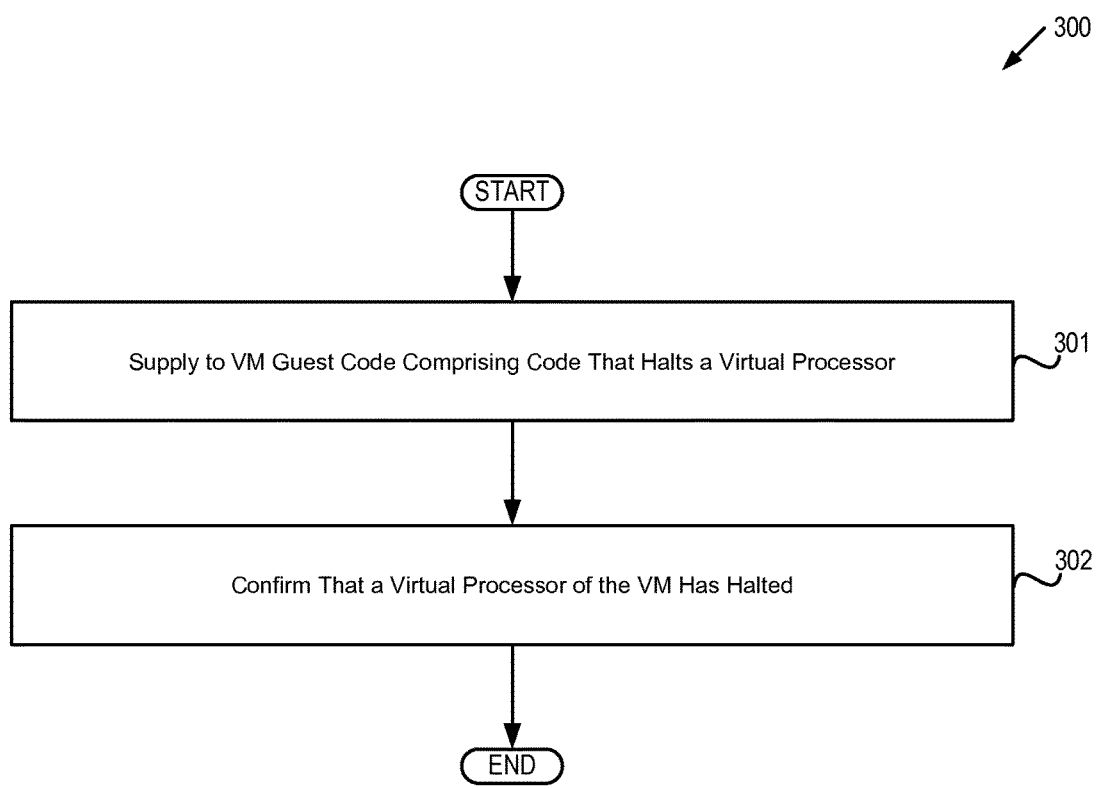
FIG. 3 depicts a flow diagram of one embodiment of a first method for detecting that a virtual machine has begun executing guest code.
Figure 4:
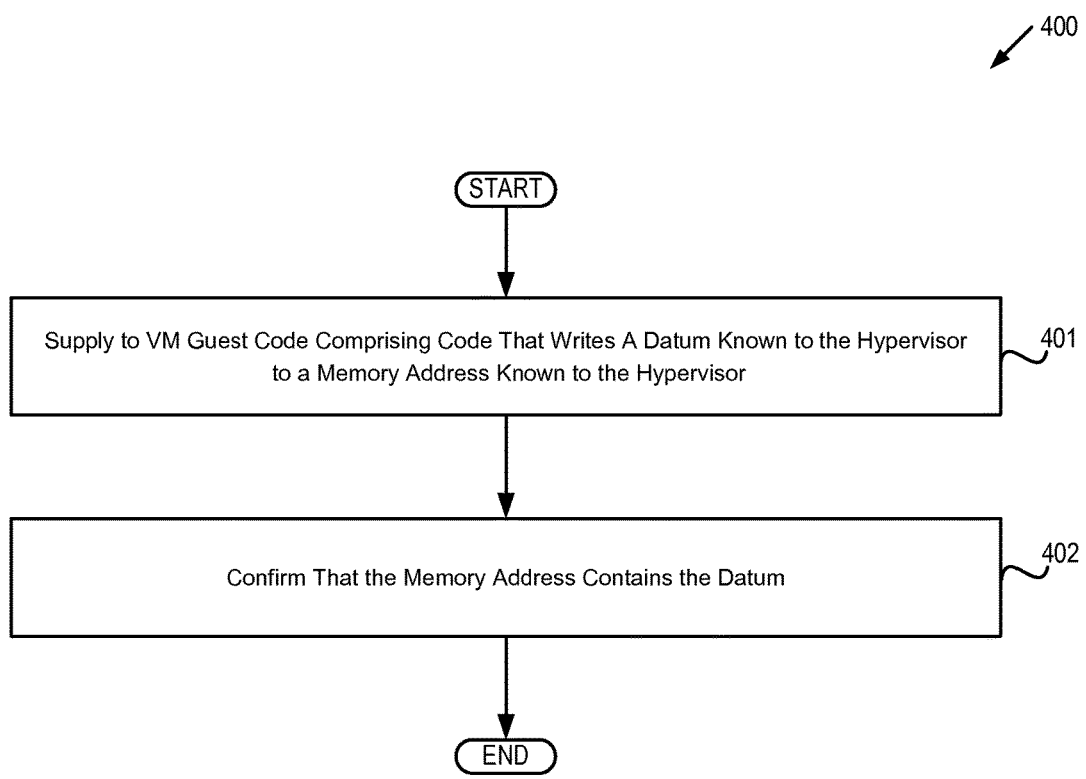
FIG. 4 depicts a flow diagram of one embodiment of a second method for detecting that a virtual machine has begun executing guest code.

In accordance with one example, hypervisor 125 may include a firmware manager 128 that is capable of inferring that firmware has created a system table in a portion of memory of virtual machine 130; of locating the system table; of providing the system table to testing application 140 for additional testing of the system table; of receiving memory access commands from testing application 140; and of executing one or more commands to test the system table itself, as is described in detail below with respect to FIGS. 2 through 4. It should be noted that in some other examples, hypervisor 125 may be external to host OS 120, rather than embedded within host OS 120.

FIG. 2 depicts a flow diagram of one embodiment of a method 200 for testing a system table associated with guest firmware of a virtual machine. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 2 may be performed simultaneously or in a different order than that depicted.

At block 201, hypervisor 125 infers that guest firmware 133 has created a system table (e.g., an ACPI table, a SMBIOS table, etc.) in a portion of memory of virtual machine 130. Two techniques for performing this inference are described in detail below with respect to FIGS. 3 and 4. In one example, block 201 is performed by firmware manager 128.

At block 202, hypervisor 125 locates the system table created by guest firmware 133. In one embodiment where the system table is an ACPI table, the hypervisor 125 locates the ACPI table by locating a root system description pointer (RDSP) that conforms to the ACPI specification and has a valid checksum. In one example, block 201 is performed by firmware manager 128.

At block 203, one or more commands are executed by hypervisor 125 to test the system table. In some examples, hypervisor 125 may provide the system table to testing application 140, which then performs additional testing of the system table, while in some other examples, hypervisor 125 itself executes the command(s) to test the system table. In one embodiment, hypervisor 125 receives from testing application 140 a memory access command that accesses the portion of memory of the virtual machine and uses the memory access command as one of the command(s) to test the system table. In one example, block 201 is performed by firmware manager 128.

FIG. 3 depicts a flow diagram of one embodiment of a first method 300 for detecting that a virtual machine has begun executing guest code. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine.

At block 301, hypervisor 125 supplies guest code 132 to virtual machine 130, where guest code 132 comprises code that halts a virtual processor. In one example, block 301 is performed by firmware manager 128.

At block 302, hypervisor 125 confirms that a virtual processor of VM 130 (e.g., virtual processor 131) has halted, thereby indicating that VM 130 initiated execution of the guest code 132. In one example, the virtual processor (e.g., virtual processor 131) executes a privileged halt instruction, which causes control to be transferred to hypervisor 125. Hypervisor 125 then records the virtual processor state as halted in hypervisor memory, and halting of the virtual processor can be confirmed by retrieving the virtual processor state from hypervisor memory.

It should be noted that in some examples, guest code 132 may be stored in a boot sector of a virtual disk of VM 130 (not depicted in FIG. 1). An example of such guest code 132 is shown below:

```
static uint8_t boot_sector[0x7e000] = {
    /* 7c00: mov $0xdead,%ax */
    [0x00] = 0xb8,
    [0x01] = LOW(SIGNATURE),
    [0x02] = HIGH(SIGNATURE),
    /* 7c03: mov %ax,0x7c10 */
    [0x03] = 0xa3,
    [0x04] = LOW(BOOT_SECTOR_ADDRESS +
        SIGNATURE_OFFSET),
    [0x05] = HIGH(BOOT_SECTOR_ADDRESS +
        SIGNATURE_OFFSET),
    /* 7c06: cli */
    [0x06] = 0xfa,
    /* 7c07: hlt */
    [0x07] = 0xf4,
    /* 7c08: jmp 0x7c07=0x7c0a-3 */
    [0x08] = 0xeb,
```

-continued

```
    [0x09] = LOW(-3),
    /* We mov 0xdead here: set value to make debugging easier */
    [SIGNATURE_OFFSET] = LOW(0xface),
    [SIGNATURE_OFFSET + 1] = HIGH(0xface),
    /* End of boot sector marker */
    [0x1FE] = 0x55,
    [0x1FF] = 0xAA,
};
```

FIG. 4 depicts a flow diagram of one embodiment of a second method 400 for detecting that a virtual machine has begun executing guest code. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine.

At block 401, hypervisor 125 supplies guest code 132 to virtual machine 130, where guest code 132 comprises code that writes a datum known to hypervisor 125 to a particular memory address known to hypervisor 125. It should be noted that in some examples, guest code 132 may be stored in a boot sector of a virtual disk of VM 130 (not depicted in FIG. 1).

At block 402, hypervisor 125 confirms that the memory address contains the datum. In one example, blocks 401 and 402 are performed by firmware manager 128.

Figure 5:
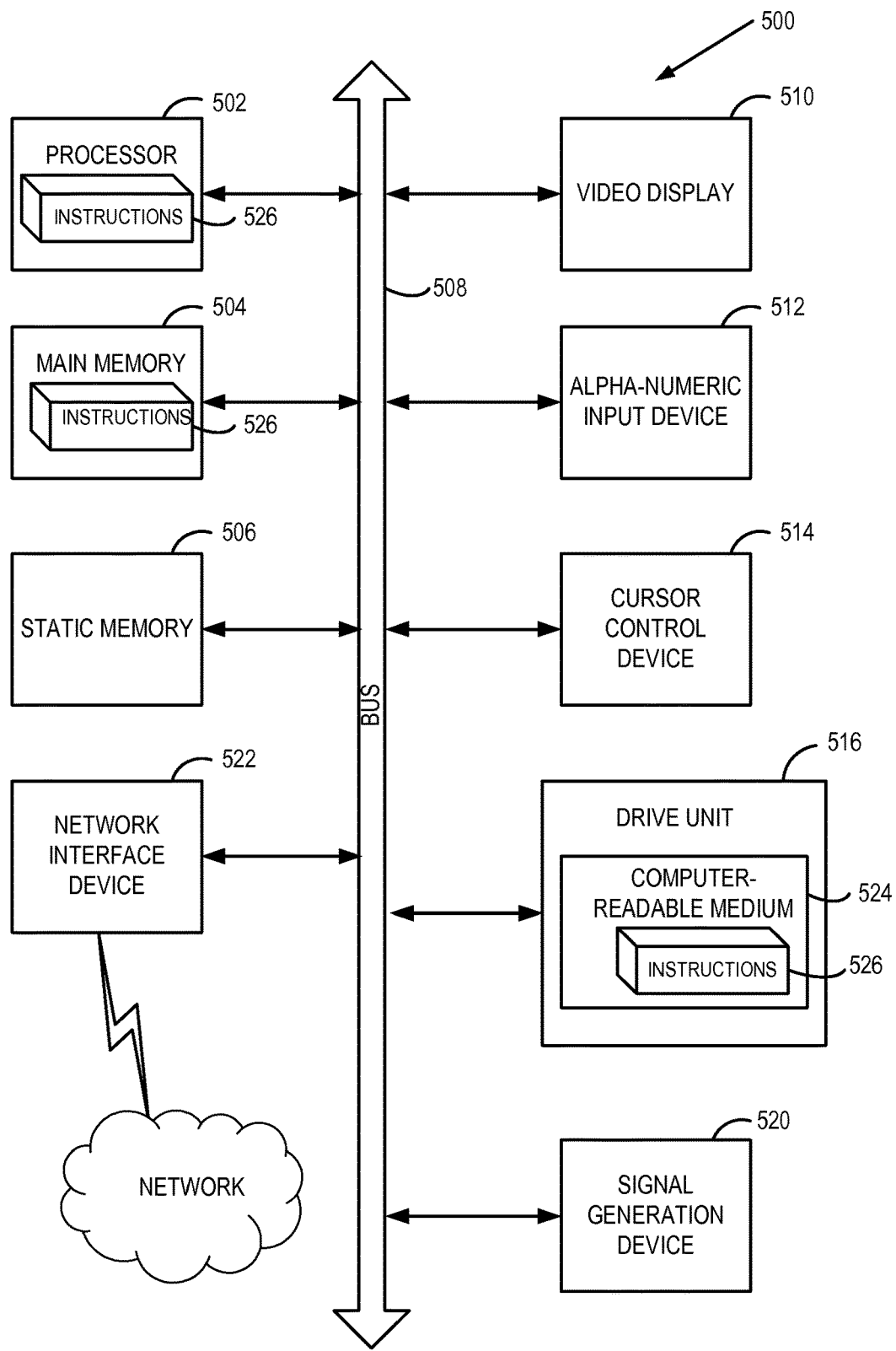
FIG. 5 depicts a block diagram of an illustrative computer system operating in accordance with embodiments of the disclosure.

FIG. 5 illustrates an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 506.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions corresponding to the methods of FIGS. 2 and 3, etc.) embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "executing", "inferring", "locating", "providing", "confirming", "computing", "comparing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., a read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   inferring, by a processing device executing a hypervisor, that firmware has created a system table in a portion of memory of a virtual machine;
   locating by the processing device executing the hypervisor, in response to the inferring, the system table; and
   executing, by the processing device executing the hypervisor, one or more commands to test the system table without participation from a guest operating system located on the virtual machine.

2. The method of claim 1 wherein the inferring is in view of a detection that the virtual machine has begun executing guest code.

3. The method of claim 2 wherein the guest code comprises code that halts a virtual processor, and wherein the detection comprises:
   providing, by the processing device executing the hypervisor, the guest code to the virtual machine, and
   confirming that a virtual processor of the virtual machine has halted.

4. The method of claim 2 wherein the guest code comprises code that writes a datum known to the hypervisor to a memory address known by the hypervisor, and wherein the detection comprises:
   providing, by the processing device executing the hypervisor, the guest code to the virtual machine, and
   confirming, by the processing device executing the hypervisor, that the memory address contains the datum.

5. The method of claim 1 wherein the one or more commands comprises:
   computing a checksum of the system table, and
   comparing the computed checksum to an expected value.

6. The method of claim 1 wherein executing the one or more commands comprises providing, by the processing device executing the hypervisor, the system table to a testing application that performs additional testing of the system table.

7. The method of claim 1 further comprising performing, by the processing device executing the hypervisor, the testing.

8. The method of claim 7 wherein performing the testing comprises:
   receiving by the processing device executing the hypervisor, from a testing application, a memory access command that accesses the portion of memory of the virtual machine, and
   issuing the memory access command to test the system table.

9. An apparatus comprising:
   a memory to store a virtual machine; and
   a processing device operatively coupled to the memory, the processing device to execute a hypervisor to:
   infer that firmware has created a system table in a portion of the memory associated with the virtual machine,
   locate, in response to the inferring, the system table, and
   execute one or more commands to test the system table without participation from a guest operating system located on the virtual machine.

10. The apparatus of claim 9 wherein to infer that firmware has created the system table is in view of a detection that the virtual machine has begun executing guest code.

11. The apparatus of claim 10 wherein the guest code comprises code that halts a virtual processor, and wherein to detect that the virtual machine has begun executing guest code, the hypervisor is further to:
    provide the guest code to the virtual machine, and
    confirm that a virtual processor of the virtual machine has halted.

12. The apparatus of claim 10 wherein the guest code comprises code that writes a datum known to the hypervisor to a memory address known by the hypervisor, and wherein to detect that the virtual machine has begun executing guest code, the hypervisor is further to:
    provide the guest code to the virtual machine, and
    confirm that the memory address contains the datum.

13. The apparatus of claim 9 wherein the one or more commands comprise commands to:
compute a checksum of the system table, and
compare the computed checksum to an expected value.

14. The apparatus of claim 9 wherein the system table is an Advanced Configuration and Power Interface (ACPI) table.

15. A non-transitory computer readable storage medium, having instructions stored therein, which when executed, cause a processing device executing a hypervisor to:
infer, by the processing device executing the hypervisor, that firmware has created a system table in a portion of memory of a virtual machine;
locate by the processing device executing the hypervisor the system table; and
execute, by the processing device executing the hypervisor, one or more commands to test the system table without participation from a guest operating system located on the virtual machine.

16. The non-transitory computer readable storage medium of claim 15 wherein to infer that firmware has created a system table is in view of a detection that the virtual machine has begun executing guest code.

17. The non-transitory computer readable storage medium of claim 16 wherein the guest code comprises code that halts a virtual processor, and wherein the detection comprises:
provide, by the processing device executing the hypervisor, the guest code to the virtual machine, and
confirm that a virtual processor of the virtual machine has halted.

18. The non-transitory computer readable storage medium of claim 15 wherein the guest code comprises code that writes a datum known to the hypervisor to a memory address known by the hypervisor, and wherein the detection comprises:
provide, by the processing device executing the hypervisor, the guest code to the virtual machine, and
confirm, by the processing device executing the hypervisor, that the memory address contains the datum.

19. The non-transitory computer readable storage medium of claim 15 wherein the one or more commands comprise commands to:
compute a checksum of the system table, and
compare the computed checksum to an expected value.

20. The non-transitory computer readable storage medium of claim 15 wherein the system table is an ACPI table, and wherein to locate the system table comprises to locate a root system description pointer (RDSP) that conforms to the ACPI specification and has a valid checksum.

* * * * *